United States Patent [19]
Oldham et al.

[11] 4,245,134
[45] Jan. 13, 1981

[54] CABLE TERMINATION APPARATUS

[75] Inventors: Ronald C. Oldham; Malcolm L. Hayward, both of Chandlersford, England

[73] Assignee: International Standard Electric Corporation, New York, N.Y.

[21] Appl. No.: 941,089

[22] Filed: Sep. 11, 1978

[51] Int. Cl.³ .............................................. H02G 9/02
[52] U.S. Cl. ................................. 174/70 S; 174/88 C
[58] Field of Search ............................ 174/70 S, 88 C

[56] References Cited
U.S. PATENT DOCUMENTS

| | | | |
|---|---|---|---|
| 2,133,448 | 10/1938 | Harley | 174/88 C X |
| 3,373,243 | 3/1968 | Janowiak et al. | 174/88 C X |

*Primary Examiner*—Roy N. Envall, Jr.
*Attorney, Agent, or Firm*—William T. O'Neil

[57] ABSTRACT

A water-tight termination of a coaxial submarine cable to a tail cable including a piece-part polyethylene molding over a polyethylene/copper/polyethylene laminate and continuity braid. Applied heat externally bonds the laminate to a plastic internal core forming the dielectric and to the piece part to form a water barrier.

5 Claims, 15 Drawing Figures

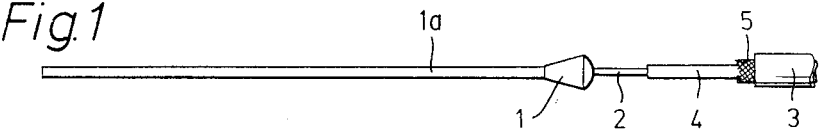
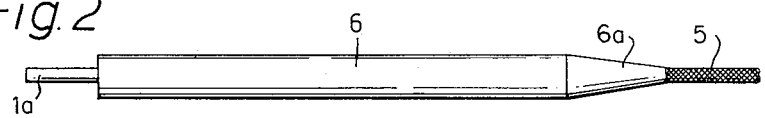
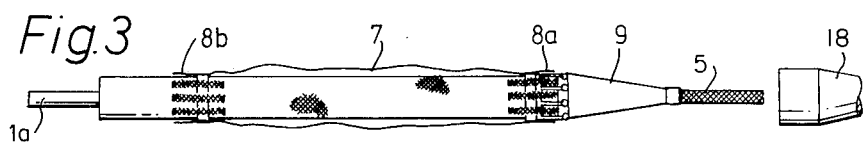
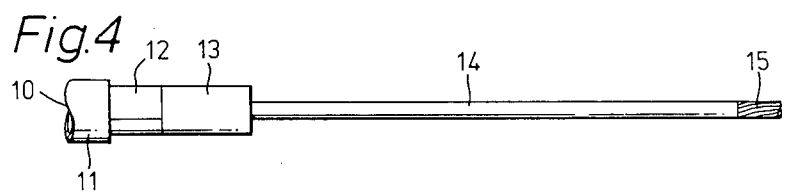
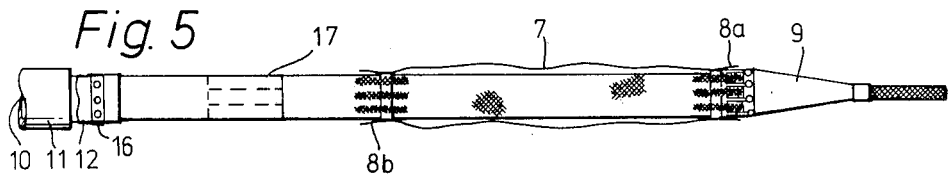
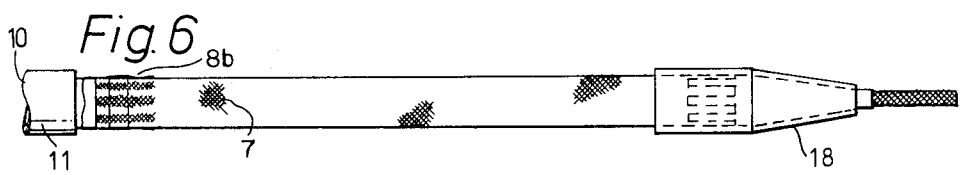
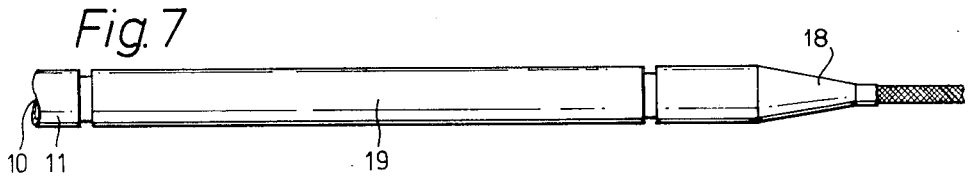
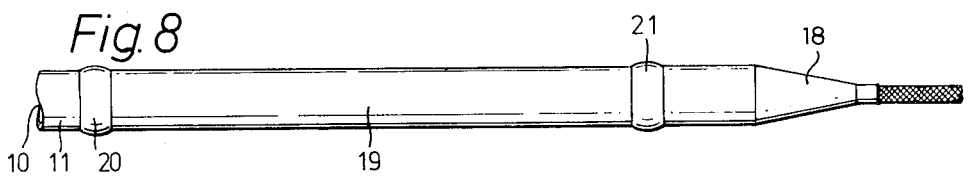

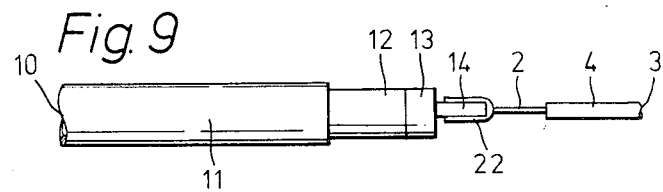
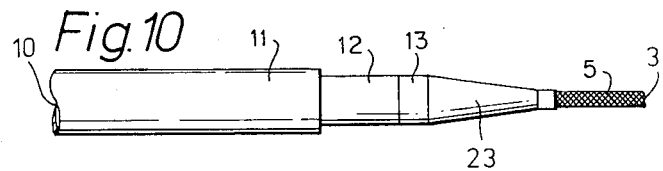
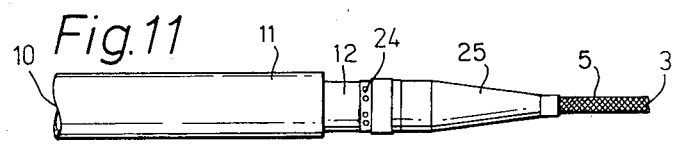
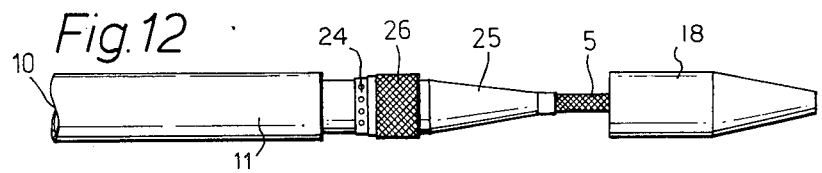
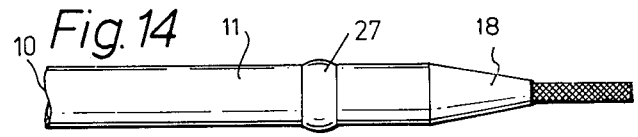

CABLE TERMINATION APPARATUS

BACKGROUND OF THE INVENTION

This invention relates to cable jointing, especially for submarine coaxial cable arrangements.

In one known configuration, a cable termination is used in which the central strength member of the cable is connected to an anchor ferrule which in turn transfers the tensile load via an anchor ceramic and dielectric molding to the external casing of a repeater housing. The ferrule provides electrical continuity between the inner conductor of the coaxial cable and the coiled tail cable which will be connected to the electric circuits in the repeater. The outer or return conductor of the coaxial cable is connected to the outer conductor of the tail coaxial cable via a braid 39 and a composite water barrier and tube assembly. The purpose of this water barrier and tube assembly is two-fold. First, it must provide an actual barrier to water intrusion by allowing the polythene to shrink onto it in a water-tight manner while contemporaneously bonding to the outer sheath of the coaxial cable. Secondly, it must provide electrical continuity for the outer conductor for connection through the tail cable.

SUMMARY OF THE INVENTION

The aforementioned water barrier and tube assembly is, accordingly, a relatively costly item and it is the general object of the present invention to simplify this construction.

According to the present invention, there is provided a cable termination assembly comprising a laminate of conductive material and adhesive, an electrically conductive ferrule, a pre-molded insulating sheath, and a conductive braid wherein a submarine, coaxial cable inner conductor and strength member and a tail cable inner conductor can be connected to the ferrule. An insulating core can be formed over the tube and ferrule with a portion having the same shape as the laminate, the laminate can be fitted onto the shaped portion and the braid can be connected to the laminate and the return conductor of the cable, the tail cable return conductor braid can be connected to the laminate, and the pre-molded insulating sheath can be fitted over the laminate, wherein by the application of heat around the pre-molded sheath the laminate becomes bonded to the insulating core on the inside and the pre-molded sheath on the outside to form a water-tight barrier around the termination.

According to the process aspect of the present invention, there is provided a method for terminating a main coaxial cable comprising; providing a ferrule, and joining the main and tail cores together via the ferrule, molding dielectric material over the ferrule and dielectric of the tail cable, and providing a laminate of conductive material and adhesive to form a tapered layer connected to the return conductor to the tail cable, establishing electrical continuity between the laminate and the return conductor of the main cable, and positioning over exposed conductors, a water-tight sheath, and applying heat to bond the water-tight sheath to the outside of the laminate via the adhesive and to bond the inside of the laminate to the molded dielectric via the inner adhesive layer of the laminate, and also to bond the sheath to the sheath of at least one of the cables.

In order that the invention can be clearly understood, a detailed description referencing the accompanying drawings follows.

BRIEF DESCRIPTION OF THE DRAWINGS

FIGS. 1 through 8 show successive steps in forming the cable termination according to an embodiment of the invention.

FIGS. 9 through 14 show successive steps in a second embodiment.

DESCRIPTION OF THE PREFERRED EMBODIMENT

Figure 8A:
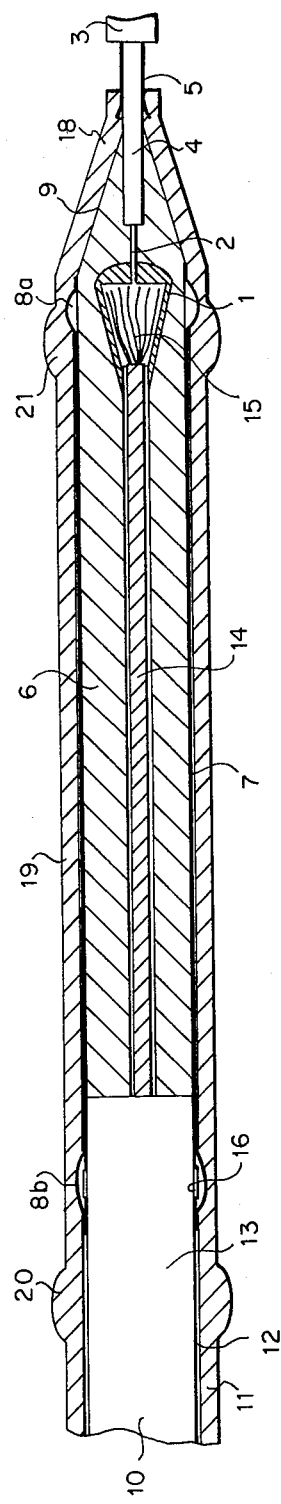
FIG. 8a depicts an axial cross-section of the embodiment of FIGS. 1 through 8.

Referring now to FIG. 1, there is provided a copper ferrule 1 into one end of which is brazed the central conductor 2 of a tail coaxial cable having an outer jacket 3 and having a plastic dielectric 4 and outer conductor braid 5. A copper tube 1a is brazed into the outer end of ferrule 1.

Referring now to FIG. 2, a polyethylene molding (molded dielectric plastic jacket) 6 is formed over a portion of the aforementioned copper tube 1a and over the ferrule 1, central conductor 2, and plastic dielectric 4. This polyethylene molding forms the dielectric of the termination.

Referring to FIG. 3, in order to provide outer conductor electrical continuity, a braid assembly 7 is formed over molding 6, the braid having axially projecting tabs 8a and 8b at opposite ends. Suitable forms of this braid are known in the prior art. In place of the complex water barrier and tube assembly of the prior art, the combination of the invention uses a laminate barrier tube 9 which has been cut generally as a sector of a circle and folded to form a frusto-conical member. This fits around the frusto-conical portion 6a of the polyethylene molding 6 shown in FIG. 2.

The laminate 9 comprises a thin copper sheet which has polythene deposited on both of its sides so that it can subsequently be bonded to the frusto-conical or tapered portion 6a of the polythene molding and to a subsequently-applied over-sheath to be described later. The tabs 8a on the braid 7 are soldered onto the copper laminate 9 and the braid 5 is itself soldered onto laminate 9.

Referring now to FIG. 4, there is shown the cut-back end of a typical lightweight submarine coaxial cable 10 having an outer sheath 11, outer conductor 12 of copper or, preferably, aluminum, a polyethelene dielectric core 13 and an inner conductor 14 on a central strength member 15 of stranded high tensile steel wires.

Looking ahead to FIG. 8a, the submarine cable exposed inner conductor 14 and strength member 15 have been inserted into the copper tube 1a. Into the copper tube 1a has previously been put some epoxy resin and when set, this bonds the central strength member 15 into the copper ferrule 1. In the case of an aluminum return (outer) conductor 12 in cable 10, there is provided an anode assembly 16 which comprises a copper/zinc/aluminum sandwich, the aluminum part of the sandwich being spot welded to the aluminum return conductor 12, leaving the copper material of the sandwich to face the like material of the braid. The zinc performs a transition function in the sandwich.

A second molding operation is performed to bond the polyethylene molding 6 (see FIG. 2) to the lightweight cable dielectric core 13. This molding is indicated at 17 on FIG. 5. Then the braid 7 is pulled until it reaches the anode assembly 16 and tabs 8a are soldered to the metal surface of 16 provide electrical continuity between the braid 5 of the tail cable and the return conductor 12 of the submarine coaxial cable 10. This is shown in FIG. 6.

Referring further to FIG. 6, a performed polythene sheath 18 (also shown detached in FIG. 3) having a tubular portion and a frusto-conical portion is applied to and fits onto the copper polyethelene laminate 9 and heat is applied around this sheath such that the sheath and the polythene of the laminate and the inner polythene molding all melt (fuse) together and becomes integrally bonded to form a water barrier.

Referring now to FIG. 7, the outer sheath 11 of the submarine cable 10 is reinstated or recreated about the copper braid by means of a sheath portion 19. This is applied conventionally over the braid and, as shown in FIG. 8, ring molds 20 and 21 are formed at each end to bond to the sheath 11 of the submarine cable 10 at one end and the sheath 18 at the other end. Then the joint is complete.

Referring now to FIG. 9, a second embodiment will be described. The end of 10 is prepared once again by exposing the central conductor 14, core 13, and outer conductor 12. A ferrule 22 is brazed to the core 2 of the tail cable 3 and then soldered to the central conductor 14 of the main cable 10. Then (FIG. 10) a molding 23 is made over the ferrule to bond integrally with the dielectric cores 13 and 4.

An anode assembly 24 (FIG. 11) is spot welded to the outer conductor 12 of cable 10, the anode assembly being the same sandwich of copper/zinc/aluminum as previously described, and a laminate barrier tube 25 (same construction as 9 of FIG. 3) is soldered (FIG. 12) to the braid 5 of the tail cable 3. At its other end is applied a short length of braid 26 which is soldered to the other end of the laminate tube 25 and also to the copper of the anode assembly 24.

A preformed sheath 18 previously applied over the tail cable is then moved into position (FIG. 13) over the joint and is heat sealed (fused) to the core 4 of the tail cable and the sheath 11 of the main cable 10. Finally, a ring mold 27 is formed (FIG. 14) on the pre-formed sheath and the cable sheath to seal these together.

The cross-section of FIG. 8a is directly related element-for-element with the embodiment of FIG. 1 through 8, additional description of that drawing being therefore not necessary. The variation of FIG. 8a to employ the second embodiment described (FIG. 9 through 14) will be evident from the drawings and description.

This arrangement is particularly suitable for use in jointing the tail cable to the main cable at a repeater termination.

What is claimed is:

1. A termination assembly for water-tight connection of a tail coaxial cable to a submarine coaxial cable, said submarine cable having an inner conductor, a dielectric core surrounding said inner conductor, a generally tubular concentric outer conductor over said core and an outer jacket covering said outer conductor; said tail cable having a central conductor, a plastic dielectric about said central conductor and an outer conductor braid over said dielectric, comprising:

a generally conical ferrule of metallic material and a substantially coaxial hollow metallic tube in communication with the smaller end of said ferrule, the inner conductor of said submarine cable being inserted axially into said metallic tube and being mechanically and electrically affixed therein;

a molded dielectric plastic jacket over said ferrule and all except a projecting portion of said hollow metallic tube adjacent its end, said jacket tapering substantially down to the diameter of said plastic dielectric of said tail cable at its end opposite said hollow metallic tube projecting portion;

first means including an auxillary conductive braid placed over said molded jacket;

second means including a hollow conductive metallic generally conical member fitted over said molded jacket and being electrically and mechanically affixed to said first means braid at its larger end and to the outer conductor braid of said tail cable at its smaller end;

third means including a second molded plastic part filling the gap between said molded jacket and the indented end of said submarine cable core, all of said molded plastic piece parts being heat fused together to form a water-tight continuous jacket.

2. Apparatus according to claim 1 in which said second means conical member is coated with plastic material on both surfaces to permit heat fusing as a part of the water-tight structure of said termination assembly.

3. Apparatus according to claim 2 in which said molded plastic parts are made of a thermoplastic dielectric material.

4. Apparatus according to claim 2 in which said auxillary braid and said second means conical part are made of copper, said conical part being coated with said thermoplastic material.

5. Apparatus according to claim 3 in which said thermoplastic material is polyethylene.

* * * * *